(12) United States Patent
Larsson et al.

(10) Patent No.: US 7,062,358 B2
(45) Date of Patent: Jun. 13, 2006

(54) SYSTEM APPARATUS AND METHOD FOR DIAGNOSING A FLOW SYSTEM

(75) Inventors: Jan Eric Larsson, Lund (SE); Fredrik Dahlstrand, Lund (SE); Bengt Öhman, Lund (SE); Jan Tuszynski, Lomma (SE)

(73) Assignee: GoalArt AB, Lund (SE)

( * ) Notice: Subject to any disclaimer, the term of this patent is extended or adjusted under 35 U.S.C. 154(b) by 12 days.

(21) Appl. No.: 10/469,665

(22) PCT Filed: Mar. 6, 2002

(86) PCT No.: PCT/SE02/00383

§ 371 (c)(1),
(2), (4) Date: Jan. 23, 2004

(87) PCT Pub. No.: WO02/071360

PCT Pub. Date: Sep. 12, 2002

(65) Prior Publication Data

US 2004/0133289 A1 Jul. 8, 2004

(30) Foreign Application Priority Data

Mar. 6, 2001 (SE) .................................. 0100767
Apr. 29, 2001 (SE) .................................. 0101526

(51) Int. Cl.
G05D 11/00 (2006.01)
(52) U.S. Cl. ........................ 700/282; 700/26; 714/36
(58) Field of Classification Search ................ 700/26, 700/18, 23, 28, 52, 80, 21, 48, 281, 282; 714/36, 46–47; 702/183–185
See application file for complete search history.

(56) References Cited

U.S. PATENT DOCUMENTS

| 5,127,005 A | 6/1992 | Oda et al. |
| 5,408,218 A | 4/1995 | Svedberg et al. |
| 5,914,875 A | 6/1999 | Monta et al. |
| 6,014,612 A * | 1/2000 | Larson et al. ............... 702/183 |

(Continued)

FOREIGN PATENT DOCUMENTS

EP 0645684 3/1995

(Continued)

OTHER PUBLICATIONS

Doctoral Thesis "Knowledge-based methods for control systems" by Jan Eric Larsson, Nov. 1992.

(Continued)

*Primary Examiner*—Kidest Bahta
(74) *Attorney, Agent, or Firm*—Ladas & Parry LLP

(57) ABSTRACT

The present invention deals with diagnosing of a flow system, using status signals carrying information about said flow system, whereby new status information is generated, which relates to a plurality of aspects of the flow system based on said status signals and dependent on a functional model and on a set of predetermined rules. The invention comprises a diagnostic apparatus (20) arranged to analyze the status signals for example by means of an alarm analyzer (23a) arranged to separate alarms into primary and secondary alarms, a sensor fault detector (23b) arranged to detect sensor values that probably are wrong or a fault diagnozer (23c) arranged to find the root causes for unfulfilled goals. Further the invention can comprise a failure mode analyzer (23d) arranged to detect functions that can stop working in the future or a process measurement analyzer (23e) arranged to analyze the status signals of a specific process.

28 Claims, 11 Drawing Sheets

U.S. PATENT DOCUMENTS 6,104,965 A    8/2000   Lim et al.
6,615,090 B1 * 9/2003   Blevins et al. ................ 700/26
6,633,782 B1 * 10/2003  Schleiss et al. ............... 700/26

FOREIGN PATENT DOCUMENTS

JP            8077477        3/1996

OTHER PUBLICATIONS

Licentiate Thesis "Methods for alarm reduction with multilevel flow models of industrial processes" by Fredrik Dahlstrand, Oct. 2000.

* cited by examiner

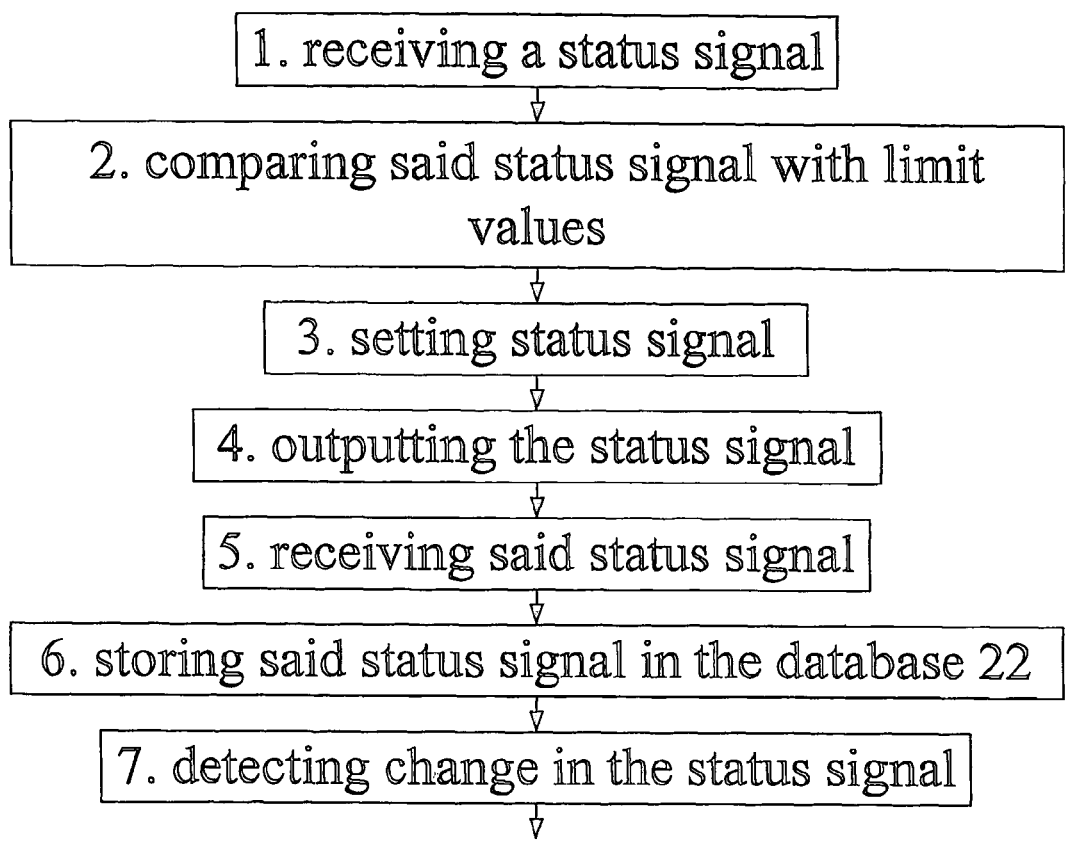
Fig. 4 (Continues on next page)

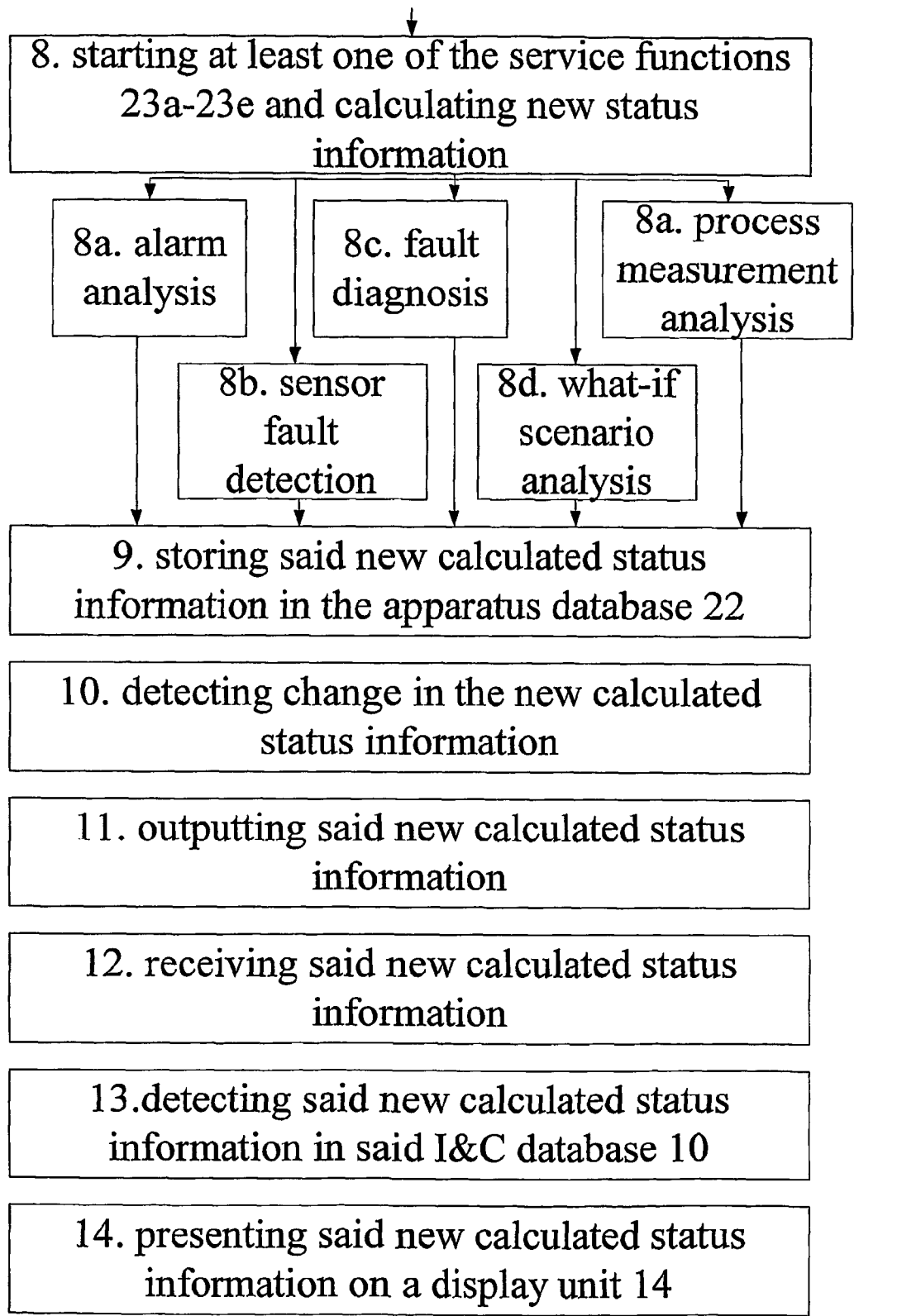
Fig. 4 (Continued from previous page)

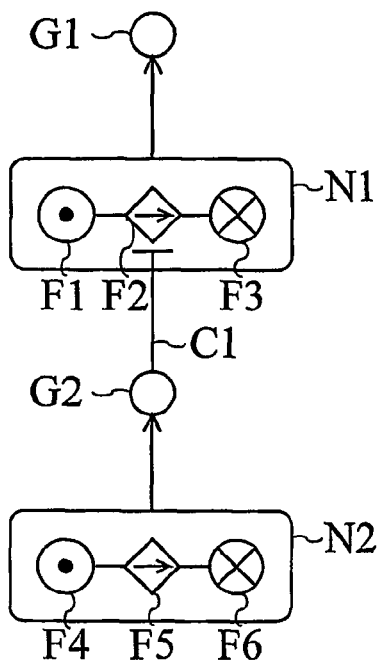
Fig. 8
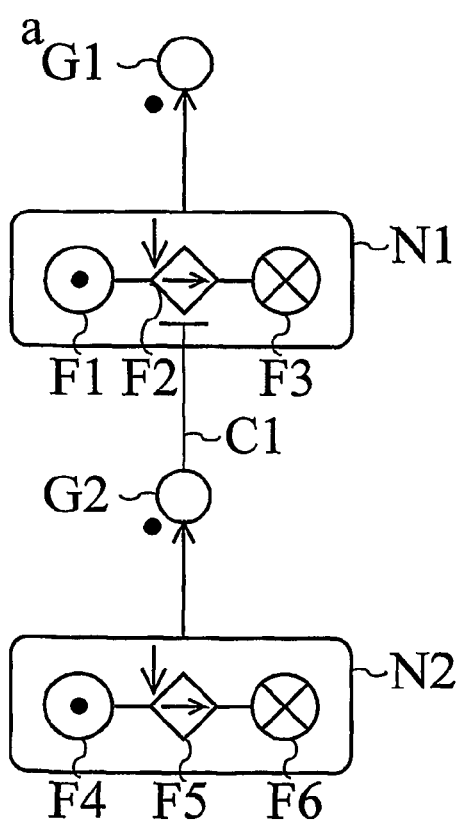 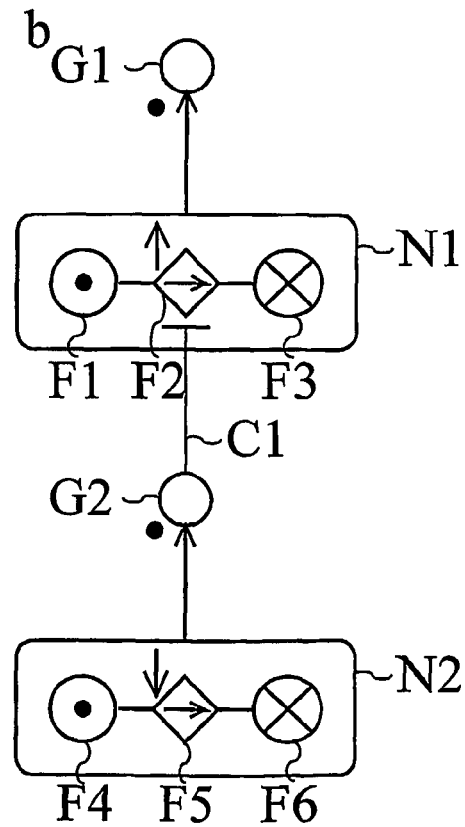
Fig. 9a and 9b

Results of Failure Mode Analysis
=====================================

T = 0
   F8: "Lubricant source"
   F9: "Lubricant transport"

T = 10
   F1: "Water pump"
   F2: "Engine heat exchanger"

T = 30
   F11: "Gasoline supply"
   F17: "Kinetic energy sink"
   F19: "Heat energy sink"

Fig. 19

SYSTEM APPARATUS AND METHOD FOR DIAGNOSING A FLOW SYSTEM

FIELD OF THE INVENTION

The present invention refers to diagnosis of a flow system, and especially to a system, an apparatus, a method and a computer program product for diagnosing the flow system.

BACKGROUND OF THE INVENTION

In critical situations the operators of complex industrial processes are often overloaded by a large amount of system information, e.g., a plurality of alarms. For example the alarms are caused by faults in different components usually monitored by sensors. Even in moderately complex systems it can be quite difficult to, reliably and quickly, find the root causes of the alarms, i.e. the locations of the faults. Thus today's complex industrial systems can be operated only thanks to advanced computer control systems. However, during normal operation, the operators are usually more or less redundant, while in fault or alarm situations they suddenly have to override the computerized control system and manually control the system. This change of state is often dramatic, since the operators are confronted with an unknown situation where plant state information is diffuse and the control monitors are flooded with alarms. Today's control systems offer very little help in such situations and there is a great risk for misunderstanding the new situation and consequently for taking sub-optimal or even wrong control measures.

The U.S. Pat. No. 5,914,875 discloses a method and an apparatus for diagnosing a plant using a plant model in an abstract function level based on a human cognitive process. However, this method and apparatus is limited to only one kind of fault diagnosis, namely to find the cause to a detected plant anomaly. Thus, it does not provide support to the operators in other tasks, such as detecting sensor faults, finding root causes in complex fault situations, predicting system behavior, and planning control actions. Furthermore, the method in U.S. Pat. No. 5,914,875 uses a simplified version of a multilevel flow model (MFM model). That is a model wherein a goal of a first network having a lower hierarchical level is connected to a second network having a higher hierarchical level and not to a function comprised in the second network, which makes the resolution of the fault diagnosis low. Thus it is possible to determine that a failed goal affects a network but not how the failed goal affects the functions inside the affected network.

In the disclosed method according to U.S. Pat. No. 5,914,875 a priority level is further assigned to the goals in the MFM model. According to the disclosed method, a failure propagation network is firstly detected, which failure propagation network comprises goals and flow structures having an abnormal state amount. Secondly, a flow structure at the lowest hierarchical level of a network having a top-goal with the highest priority level is selected to be diagnosed first, since it is considered that a failure propagates from a lower hierarchical level to a higher, and since that flow structure is considered to be functionally important and close to the origin of the anomaly. During the diagnosis of the flow structure, the state of elements comprised in the flow structure is determined. The determination is accomplished by searching the path from an element having a measured abnormal state to other elements having a measured abnormal state and assigning an abnormal state to the elements in between. However, if the path includes elements having a measured normal state, the elements between the abnormal element and the normal element are assigned a normal state. Thirdly, the abnormal elements of the selected flow structure is diagnosed using the state amounts of a set of elements determined or assumed as normal elements and by using mass balance or energy balance calculations to determine an estimation of the state amount of the abnormal elements. Further, if the state amount of the measured abnormal element is determined to be normal by means of the balance calculation, that element is considered to have a normal state. Thus, the method for finding the cause to a detected plant anomaly according to U.S. Pat. No. 5,914,875 is unnecessary computationally inefficient.

OBJECT OF THE INVENTION

Therefore, an object of the invention is to offer a new functionality for control systems, which will help the operators to analyze and understand situations in the industrial process, and thereby to take correct and quick measures. Thus, to offer an increased understanding of the process in critical situations when the operators are overloaded with a large amount of system information such as alarms, and thereby helping the operators of taking optimal countermeasures.

Another object of the present invention is to provide a system, an apparatus, a method and a computer program product that facilitate the monitoring and the diagnosis of an industrial process using a minimum of computational resources.

Yet another object of the invention is to provide two-way communication between the existing control system and the diagnostic apparatus. This is required for receiving information from a target system or an instrumentation and control systems (I&C systems), as well as presenting the result from the monitoring and diagnosis to the operators on a display unit.

SUMMARY OF THE INVENTION

The above mentioned objects are fulfilled with the present invention providing means for handling the information from an industrial plant or the like, which means processes the information dependent on a functional model of the plant and on a set of predetermined rules. The processed information can then be presented to an operator of the industrial plant, whereby the operator can take a suitable measure dependent on the processed information. Dependent on for example the type of industrial plant or operating mode, different means for handling the information or a combination of different processing means can be desired or suitable to provide relevant or desired information to for example an operator. Thus the present invention comprises a control unit controlling the means used for processing the information from the plant.

More specifically, the present invention deals with diagnosing a flow system, using status signals carrying information about said flow system, and comprising means for generating or calculating new status information, that relates to a plurality of aspects of the flow system, that is based on said status signals and that is dependent on a functional model describing the functionality of said flow system and on a set of predetermined rules, such as a set of consequence propagation rules. In one embodiment of the invention, the functional model is a multilevel flow model of the flow system.

An embodiment of the invention comprises a diagnostic apparatus arranged to analyze or process a status signal relating to a flow system by means of at least one service function. The service functions can comprise an alarm analyzer arranged to separate alarms into primary and secondary alarms, which information can help an operator to focus on the primary alarms when taking countermeasures, since the secondary alarms only occur as a consequence of the primary alarms.

Further, the service function can comprise a sensor fault detector arranged to detect sensor values and/or sensor measurements that probably are wrong, which information can inform an operator to not rely on these sensor values or sensor measurements.

A fault diagnozer can further be comprised in the present invention, which fault diagnozer is arranged to find the root causes for unfulfilled goals or purposes of the flow system by reducing the functional model to be traversed during the fault diagnosis. By finding the root causes, countermeasures can be taken more efficiently and correctly.

The service functions can further comprise a failure mode analyzer arranged to detect functions that may stop working in the future and to estimate time when the function may stop working, whereby an operator can taken suitable counter-measure on beforehand, for example changing or repairing the component of the flow system relating to the detected function.

Furthermore a process measurement analyzer can be comprised in the service function, which process measurement analyzer is arranged to analyze the status signals of a specific process and to produce a report of the quality of the alarms and measurements or of other information relating to the alarms and the measurements.

An embodiment of the invention comprises further a control unit, here also called a diagnostic system manager, arranged to control the service functions, i.e. controlling which service function or service functions that is/are to be activated or deactivated.

DEFINITIONS

In the description text of the present invention, the following definitions will be used:

Flow system refers to a system of components in operation having a flow of entities between them, and the capabilities of the components concerning the flow, such as the capabilities to store, transport, provide, consume, and control the flow of entities. These entities could virtually be anything that obeys conservation laws, e.g., mass, energy, cash, or information flows. In a mass flow system the components can be pumps, tanks, conveyor belts, chemical reactions, biological processes, or other components that are used to maintain flows of mass. In an energy flow, the components can be radiators, batteries, electrical outlets, cords for transmission of electrical energy, or radioactively decaying material. In an information flow the components can be PID-regulators, sensors, and actuators, but also more abstract components such as information storage on an Internet server, network switches, document delivery systems, and means for verbal communication. A cash flow system can comprise components such as bank accounts, financial transactions, and investments. In this text the wording component will also refer to a component comprising or constituted of at least two other components, so-called sub-components.

Process or flow process refers to the interaction between the components of a flow system. A process comprises at least one flow system but it can also comprise a plurality of flow systems, which can be independent or interdependent. An example can be a heat exchanger comprising a flow of water (a mass flow) and a flow of heat (an energy flow), which flows are required for proper operation of the heat exchanger. Another example can be a chemical process that uses heat (an energy flow) to enable a chemical reaction (a mass flow). Yet another example is the air supply system (a mass flow) of a space vessel, which is required to allow the astronauts to make decisions (an information flow).

Goal refers to the purpose of a process or a flow system and is the outcome towards which certain activities of the process are directed. A goal could for example be to keep the level in a tank high enough and a sub-goal could be to provide electrical power to a pump, which is pumping water to the tank, wherein the sub-goal has to be fulfilled for the main goal to be fulfilled.

Function refers to the capabilities of the components, which are used to fulfill the goals. A source function can for example be used to model the capability of a tray, i.e., to provide an infinite amount of mass, or the capability of a power plant to provide an infinite amount of energy. Further, a transport function can, for example, be used to model the capability of a pump, i.e., to move an amount of mass, or the transfer of cash from one account to another, i.e., move an amount of cash. A function can also be used to describe the capability to control the fulfillment of a goal. The manager function can be used to model the capability of the operators of a power plant to control the production of energy, and thereby fulfilling the goal of the power plant.

Multilevel Flow Model (MFM) describes the goals and functions of a target system/plant or of a process. Multilevel flow models are graphical models on which it is possible to base several different methods for diagnostic reasoning. The multilevel flow model of a plant can be divided into several smaller model parts each one having a goal to fulfill. These goals are the above-mentioned sub-goals.

Network or flow refers to a set of connected functions which models a part of the plant or process and which functions co-operate to fulfill a goal connected to the network. The relationship between a network and a goal can be described by means of an achieve relation, indicated as an arrow in the figures.

Target system or plant is the system that is monitored, observed, analyzed or diagnosed by the invention, including at least one flow system and/or a monitoring or control system, such as an instrumentation and control system.

Signals or parameters are, in a physical flow system generated analog or digital waveforms used to carry information. Sensors arranged at the components can for example register the, signals. In a non-physical flow system, such as a business or a management system, specific parameters are used to carry information about the components.

A status signal is the comprehensive term for a signal that provides information about the status of the process, wherein the information comprises both quantitative status signals, such as measurements, and qualitative status signals, such as alarms, alarm signals, and events.

Measurement signals or measurements are quantitative descriptions of the status of process components, e.g., the level in a tank or the flow rate through a pipe or the like in a flow system. The measurements are recorded for example by sensors, which are typically comprised in a target system, for example in an instrumentation and control system.

Alarms are qualitative descriptions of the status of components and are generated when the measurements are not acceptable according to a predetermined function defining limit values of operation, e.g., the level in a tank is too high or the flow rate through a pipe is too low. The alarms can be generated in a target system, for example in an instrumentation and control system comprised in or connected to the target system.

Alarm signals, alarm values, and alarm states are qualitative descriptions of the status of the components and typically indicates qualitative classification of quantitative values according to limit values defined by a predetermined function. Thus the alarm signals, alarm values, and alarm states typically include the qualitative values high, normal, or low. Thus the alarm signals, alarm values, and the alarm state comprise the qualitative value normal as well, as distinguished from the alarms which do not comprise the qualitative value normal.

Events are qualitative information about those events, other than the events that give rise to alarm signals or alarms that occur in the process e.g., control actions such as closing a valve, or changes in the mode of operation, such as startup or shutdown. The events are generated in a target system, e.g., an information and control system.

Calculated or generated status information is information calculated or generated by the service functions comprised in the system according to the present invention. The calculation is based on the status signals received from a target system or from an instrumentation and control system. The calculation is further dependent on the functional model of the target system or the process and on a predetermined set of rules, for example a predetermined set of consequence propagation rules.

Consequence propagation rules comprise a set of predetermined causality rules describing the relationship between different parts and/or components in a flow/network of the target system/plant or process, i.e., describing how the parts and/or components comprised in the flow/network affect each other. The consequence propagation rules comprise also a set of conditional relations between networks, which relations are called condition relations. The condition relations can describe the relationship between a goal and a network, e.g. "in order to fulfill a function of a second network a goal of a first network has to be fulfilled". The rules can be described by simple if-statements or by more complex logical expressions.

BRIEF DESCRIPTION OF DRAWINGS

The present invention will be described in more detail with reference to the accompanying drawings, in which FIG. 1 schematically shows an embodiment of the system according to the present invention;

FIG. 4 shows the steps comprised in an embodiment of the method according to the invention;

FIG. 8 shows an MFM model with two networks, wherein the lower network N2 describes a flow of electricity, and the upper network N1 describes a flow of water;

FIG. 9a shows that the functions F5 and F2 have low flow alarms;

FIG. 9b shows that the function F5 has a low flow alarm, and the function F2 has a high flow alarm;

FIG. 19 shows an exemplifying output from an embodiment of the failure mode analyzer comprised in the system according to the invention.

DETAILED DESCRIPTION OF THE INVENTION

The present invention refers to a system, a diagnostic apparatus, a method and a computer program product for helping an operator of a target system or a flow process to understand situations of the process. Especially, the inventive concept helps the operator to understand critical situations quickly and to plan and perform corrective actions as well as to take appropriate measures.

An embodiment of the system according to the invention comprises a diagnostic apparatus arranged to communicate with a target system. The diagnostic apparatus receives from the target system status signals, both quantitative, such as measurements, and qualitative, such as alarms, alarm signals, and events. When the diagnostic apparatus detects a change in a status signal, a new signal or new status information can be calculated or generated by a service function comprised in the diagnostic apparatus. Said new calculated or generated status information can then be outputted back to said target system and presented to an operator on a display unit, whereby said operator can take necessary and appropriate counteractions if a critical situation is presented.

Figure 1:
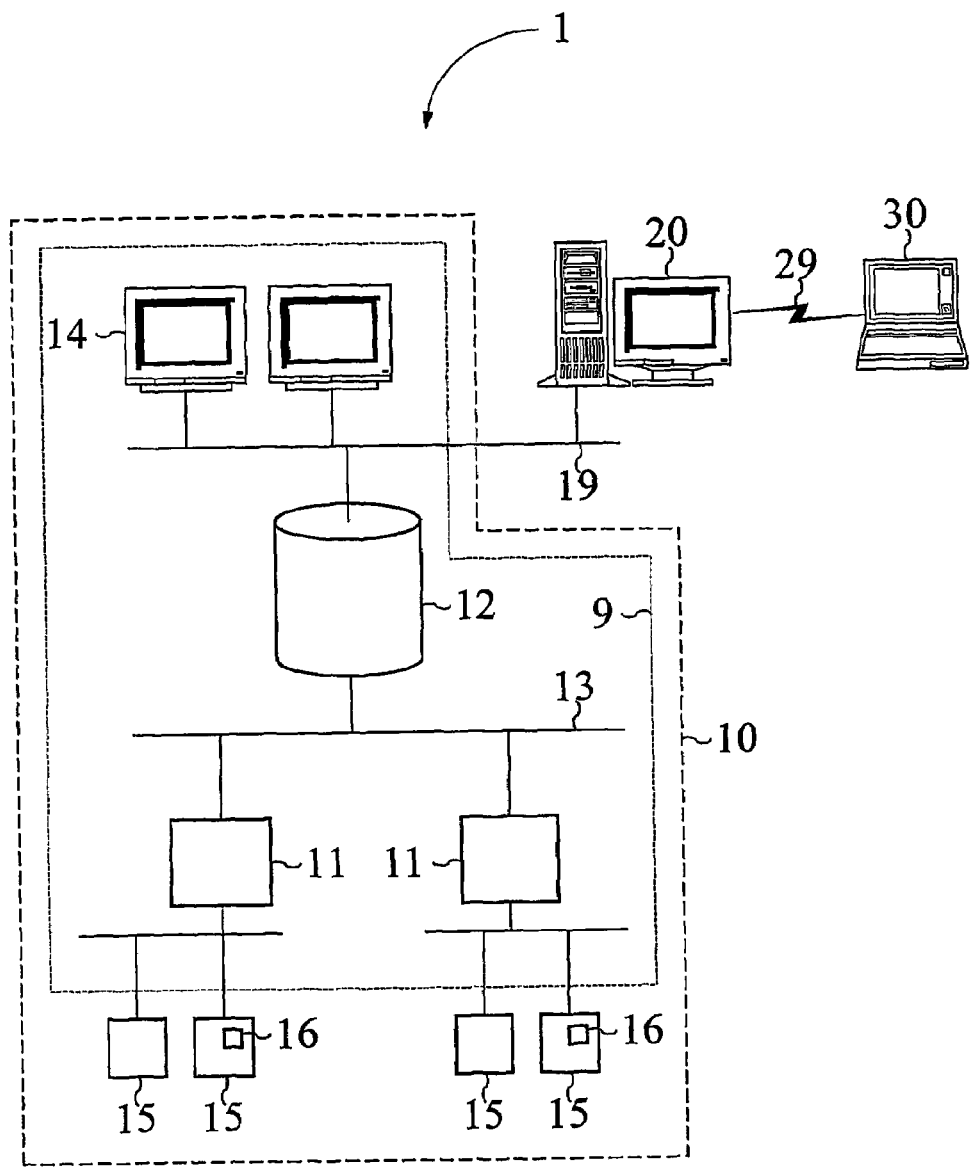

The present invention will now be described in more detail with reference to the accompanying drawings. FIG. 1 shows an embodiment of a system 1 according to the invention, comprising a target system 10 and a diagnostic apparatus 20, wherein the diagnostic apparatus 20 can be a computer-based apparatus or a computer such as a personal computer.

Such a computer-based apparatus would typically comprise a data processing unit that is loadable with program code realizing functions and procedures of the invention. A data processing unit would comprise a processor, data storage memory and data input/output interfaces. The data input/output interfaces comprise in different embodiments an input stage and an output stage realized as inputs or outputs for physical signals or computer program parameters.

The target system 10 comprises in one embodiment of the invention a process control system 11, an instrumentation and control database 12, an internal bus system 13 and possibly also a display unit 14 or a plurality of display units 14. Further, the target system 10 comprises a plurality of components 15 realizing the purpose of the target system 10.

In one embodiment of the invention, the process control system 11, the control database 12, the bus system 13 and the possible display unit 14 are comprised in an instrumentation and control system 9, which is comprised in or communicatively connected or coupled to said target system 10.

The target system 10 comprises also a plurality of sensors 16 connected to components 15, whereby the status of the components 15 can be measured. In one embodiment of the invention, the sensors are comprised in the process control system 11.

The process control system 11 is further connected to the instrumentation and control database 12 via the internal bus system 13, whereby the status signals measured by the sensors can be transmitted to the instrumentation and control database 12. The instrumentation and control database 12 can further be communicatively connected to at least one display unit 14, such as an operator station or a printer, and to the diagnostic apparatus 20 of the invention, via a first two-way communication link 19. Said first communication link 19 is preferably a wired communication link comprised in for example a local area network (LAN) such as Ethernet, but it could also be another mode of communication, e.g., a point-to-point communication using a modem, or a wireless communication link that fulfills the requirements for reliable transmission of information.

Figure 2:
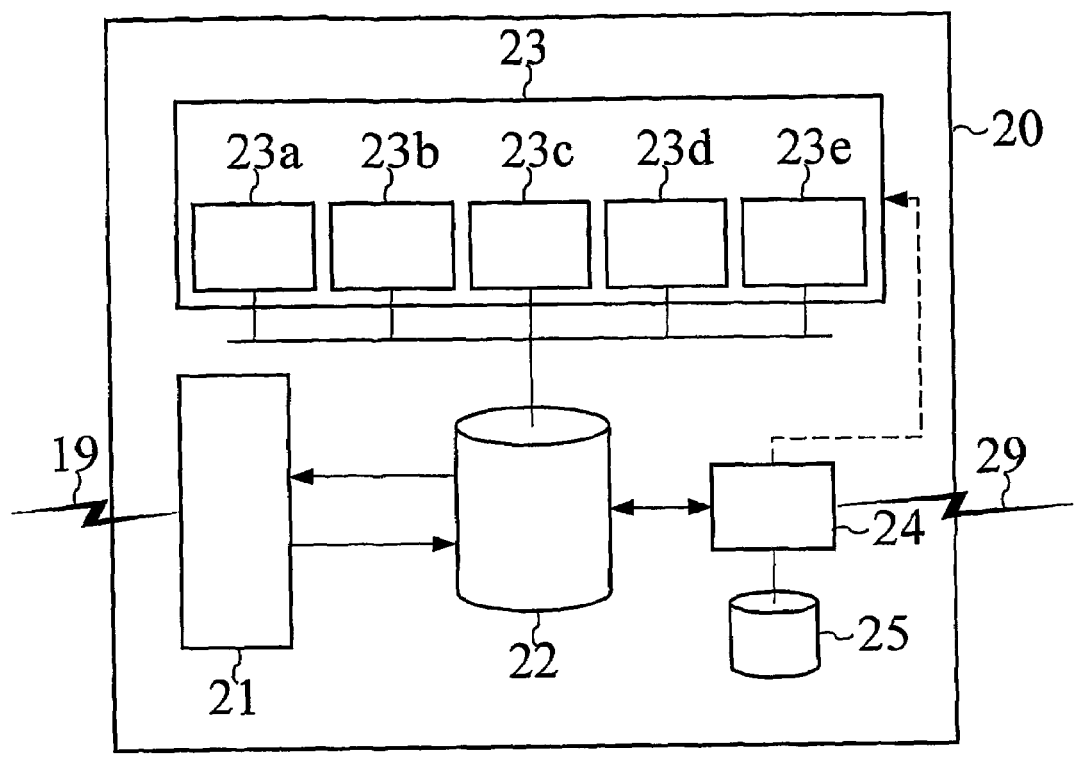
FIG. 2 schematically shows an embodiment of the diagnostic apparatus according to the present invention.

FIG. 2 shows in more detail an embodiment of the diagnostic apparatus 20 according to the invention. The apparatus 20 comprises an interface 21 between the target system 10 and a database dedicated for the function of the diagnostic apparatus, here called an apparatus database 22. As mentioned above, the target system 10 and the diagnostic apparatus 20 are communicatively connected by means of the first communication link 19. The apparatus database 22 is arranged to comprise a functional model, such as an MFM model (Multilevel Flow Model), representing or modeling the process, a set of predetermined rules, e.g. a set of consequence propagation rules. Further, the apparatus database 22 comprises information about status signals received from the process or processes, such as alarms, alarm signals, measurements, and events. The database 22 preferably resides on a data storage device.

The diagnostic apparatus 20 comprises further a set of service functions 23 comprising at least one service function 23, but can comprise a plurality of service functions 23a–23e, arranged to analyze and validate the system information in the apparatus database 22. The service function 23 is for example realized in the shape of a computer program code. The service functions 23 can for example comprise an alarm analyzer 23a, a sensor fault detector 23b, a fault diagnozer 23c, a what-if scenario analyzer 23d, and a process measurement analyzer 23e, but other service functions can also be comprised.

An example of another possible service function is a service function providing state-based alarm suppression, which means that the generation of alarm signals and alarms is made a function of, i.e. dependent on, the operating state of the target system. Another possible service function provides state-based alarm priority, which means that the alarms are given an importance ranking based on the operating state or mode of operation of the target system. Yet another example of a possible service function is rule-based monitoring and fault diagnosis, which means that the service function uses if-then rules for detecting faults and roots causes, based on crisp or fuzzy logic.

However, these service functions 23 can also be comprised in a plurality of apparatuses realized in hardware or by means of separate computer program code portions, whereby one apparatus comprises the alarm analyzer 23a and another the sensor fault detector 23b, etc. These apparatuses are preferably communicatively connected to each other and comprise or share access to the same information, the same set of consequence propagation rules, and the same functional model of the plant or flow process.

Using the alarm analyzer 23a according to one embodiment of the invention, the system 1 is arranged to separate a secondary alarm from a primary alarm, i.e., to separate an alarm that is a consequence of another alarm from an alarm that is not a consequence of another alarm. By assuming that only the primary alarms are critical and thus relevant, and by presenting them together with the secondary alarms in a structured manner to the operator, the alarm situation can be more easy to handle and consequently, measures can be taken more effectively.

According to an embodiment of the invention, the sensor fault detector 23b is arranged to detect sensor values and/or sensor measurements that probably are wrong, due to for example sensors that are out of order or alarm signals that are wrongly tuned, i.e., the limit values for the alarm signals are wrong.

The fault diagnozer 23c is, according to an embodiment of the invention, arranged to find the root causes for unfulfilled goals by reducing the MFM model to be traversed during the fault diagnosis and thus to speed up the diagnosis.

According to an embodiment of the invention, the failure mode analyzer 23d is arranged to inform an operator about functions that can stop working in the future. The failure mode analyzer 23d is also arranged to estimate when the function can stop working.

The process measurement analyzer 23e is, according to one embodiment of the invention, arranged to analyze the status signals of a specific process and to produce a report of the quality of the alarm signals and measurements of the process.

Furthermore, an embodiment of the diagnostic apparatus 20 comprises a control unit 24, here called a diagnostic system manager 24, controlling the service functions 23a–23e, i.e., controlling which service function or service functions 23a–23e that should be active at each moment or point of time. Thus, the diagnostic service manager 24 is arranged to activate or deactivate a service function 23 dependent on selectable or predetermined information, such as time point, time interval, information relating to a status signal or dependent on for example a user command.

A purpose of the diagnostic system manager (DSM) 24 is, in an embodiment of the invention, further to monitor the behavior and performance of the diagnostic station 20 or the service function 23. The manager 24 monitors, among other things:

available resources, for example, memory;
active service function(-s) 23a–23e, i.e., which service function(-s) 23a–23e that is/are available;
the state of the service function(-s) 23a–23e, i.e. is the service function active or not, for example, a service function 23a–23e can freeze and does not respond to outer stimuli such as changes to alarm signals;

unexpected external events, which affect the operation of the diagnostic station 20, such as loss of electrical power or loss of communication link;

maintenance operations, during which operations for example more service functions 23a–23e can be added to the capabilities of the diagnostic station 20 or a modified MFM model can be transferred to the diagnostic station 20; and other failures of the diagnostic station 20, such as equipment failure.

The manager 24 is also arranged to control when the service functions 23 are available. In one industry process, the system can for example only need the alarm analyzer 23a, the sensor fault detector 23b, and/or the fault detector 23c, while in another process, the system can need all the service functions 23a–23e. In yet another process is for example the what-if scenario analyzer 23d only intended to operate under certain circumstances, which are controlled by the manager 24. These kind of operatively connected options are defined during the installation of the system but can also be changed during the operation of the system or during the operation of the diagnostic station 20 by means of a user command or the like inputted via a user interface. The manager 24 starts at least one service function 23 and when the service function 23 is completed, a note is written to the diagnostic system database 25 indicating whether the service function 23 completed successfully or not.

In one embodiment of the invention, the manager 24 also monitors the state and behavior of the diagnostic apparatus 20 by sending signals or information between the different units comprised in or coupled to the diagnostic apparatus 20. The manager 24 is in one embodiment connected to a diagnostic system database 25 comprising for example historical information about the state and behavior of the diagnostic apparatus 20. This could for example be information about unexpected failures in the diagnostic apparatus 20, such as power failure, database failure, or hard disc failure. All the collected information, about the status of the diagnostic station 20, is stored in the diagnostic system database 25.

In the case of equipment failure the manager 24 is in one embodiment of the invention able to change between redundant units of the inventive system 1, e.g., there can be a redundant backup database or data storage device for alarms, events, measurements, and MFM models. The backup database can for example be a copy of the apparatus database 22, wherein its-information content is identical to the information content in the apparatus database 22. However, according to one embodiment of the invention, the backup database can also be comprised in the apparatus database 22, such that the two databases share the available storage and their information contents being identical. The backup database can be used as a primary database in case of a failure in the main database. Thus, the diagnostic system manager 24 is capable of a limited form of self-repair.

Figure 3:
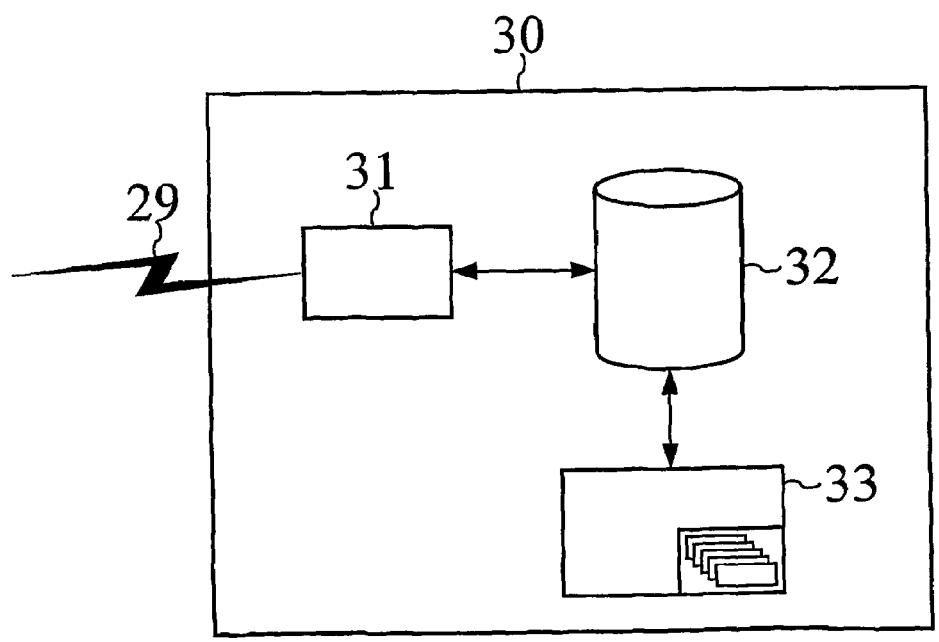
FIG. 3 shows an embodiment of the engineering station comprised in an embodiment of the system according to the invention.

An embodiment of the system according to the invention can further comprise an engineering station 30, which can be a computer-based or computerized apparatus or a computer such as a personal computer. The engineering station 30 is communicatively connectable or coupable to the system manager 24 by means of a second two-way communication link 29. The communication link 29 is preferably a wired communication link comprised in for example a local area network (LAN) such as Ethernet, but another mode of communication, e.g., a point-to-point communication using a modem, or a wireless communication link that fulfills the requirements for reliable transmission of information can also be used. In one embodiment of the invention, the engineering station 30 is used as a tool to configure the diagnostic station 20 before and/or during normal operation. However in another embodiment, it is connected to the diagnostic system 1 only during the installation of the diagnostic station 20 and/or during the maintenance of the diagnostic station 20. An embodiment of said engineering station 30 is shown in FIG. 3, wherein the engineering station 30 comprises a diagnostic system configurator 31 and an engineering database 32 connected to said configurator 31. The engineering database 32 comprises further a model of the plant or target system, preferably a functional model such as an MFM model, and configuration data.

The diagnostic system configurator 31 is arranged to configure the behavior of the diagnostic station 20, for example which service function 23 or service functions 23a–23e that is/are available and at which operation interval a specific service function 23a–23e should be active, e.g., always, every hour, or once a week. This operation interval can be specified during the installation but can also be changed during the operation of the target system or diagnostic system 1. Further, the configurator 31 is arranged to configure which of all the status signals, provided by the instrumentation and control system 10, that should be monitored by the diagnostic station 20. Furthermore, the diagnostic system configurator 31 also configures the specification of which service functions 23a–23e that use the different status signals. Yet another purpose of the configurator 31 is to establish a communication link with the diagnostic system manager 24 of the diagnostic station 20, and to transfer configuration data and the appropriate MFM model to the diagnostic apparatus 20. During maintenance of an already installed diagnostic station 20, the configurator 31 is arranged to retrieve and analyze the historical status data, comprised in the diagnostic system database 25 and generated by the diagnostic system manager 24.

The engineering station 30 comprises further a builder 33 arranged to construct and build the plant model, which preferably is an MFM model of the plant or the target system. The builder 33 is preferably a tool that is arranged to use a graphical representation of the MFM models but it could also comprise a purely text based interface based on logical expressions or the like. Furthermore, the builder 33 contains the same service functions 23a–23e as the diagnostic station 20. This means that it is possible to validate the behavior of the service functions 23a–23e on a particular MFM model, even when it is not possible to get access to the actual process, for example during the design of the process. It also means that it is possible to validate the behavior of the service functions 23a–23e on a particular MFM model, even before the industrial plant is built. Thus, the MFM model can be validated before it is transferred to the diagnostic apparatus 20. The builder 33 comprises also the algorithms or computer program parts used to implement the service functions 23a–23e in the diagnostic apparatus 20.

An embodiment of the method according to the present invention comprises the steps of (cf. FIG. 4):

1) receiving or retrieving in the instrumentation and control database 12 system information, e.g., a plurality of status signals, from the process control system 11 via the internal bus system 13;

2) comparing said status signals with limit values defined by predetermined functions;

3) setting status signals, i.e., by generating:

alarm signals;

alarms if the status signal is outside the range of the limit values; and events.

4) outputting the status signals from the instrumentation and control database 12;
5) receiving or retrieving in the database interface 21 said status signal from the instrumentation and control database 12;
6) storing said status signal in the database 22 of the diagnostic apparatus 20;
7) detecting a change in the status signal value in the apparatus database 22;
8) starting at least one of the service functions 23a–23e and calculating or generating new status information based on said received status signal and dependent on a predefined model of the target process and on a set of predetermined rules (the method steps 8a–8e relating to the step of generating status information by means of the service functions 23a–23e, respectively, will be described in more detail below);
9) storing said new calculated or generated status information in the apparatus database 22;
10) detecting a change in the new calculated status information in the apparatus database 22;
11) outputting said new calculated status information via the database interface 21 of the apparatus 20;
12) receiving said new calculated status information in the instrumentation and control database 12;
13) detecting said new calculated status information in said instrumentation and control database 12;
14) possibly, presenting said new calculated status information on a display unit 14.

The service functions 23a–23e, mentioned above, will now be described in more detail.

The Alarm Analyzer 23a

In one embodiment of the invention, the alarm analyzer 23a is arranged to classify the alarms into two categories, primary and secondary alarms. The primary alarms comprise alarms that are directly connected to the primary source of the failure and the secondary alarms comprise alarms that can be the consequence of a primary alarm. However, it is also possible that secondary alarms are hidden primary alarms, i.e., primary alarms that are failed in such way that they appear to be caused by another failure. The alarm analyzer 23a is further arranged to use sensor values to perform said analysis of the alarms.

Figure 5:
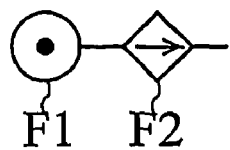
FIG. 5 shows a source function F1 connected to a transport function F2.

FIG. 5 shows an MFM model situation, wherein a tray, described by a source function F1, provides water to a pump, which pump is described by a transport function F2. If for example the transport F2 in FIG. 5 transports too much water, the tray will eventually run out of water even though the tray is able to provide as much water as the pump requires. Thus the tray is in a state of low capacity generating a low capacity alarm state. Since the pump is the cause of the low capacity alarm, the transport (F2) is a primary fault, i.e. a primary alarm, and the source (F1) is a secondary fault, i.e. a secondary alarm. If there is no measurement from the tray the alarm analyzer 23a will guess the alarm state of the source function based on the alarm state of the transport function, in this example, low capacity. This type of intelligent guessing in the MFM alarm analyzer 23a is called consequence propagation. Table 1 lists the rules for the consequence propagation used in the simple example given above. The sources or source functions are in general denoted by S and the transports or transport functions are in general denoted by T. Part I shows the rules for alarm state consequence propagation. Note that this only applies to functions without a sensor. Part II shows the rules used to determine failure state of the source function, and finally part III shows the rules used to classify the alarm. Further, similar rule sets or set of consequence propagation rules exist for all legal MFM connections in the MFM model of the plant. Since MFM is a graphical language with well-defined syntax and semantics, some of the connections are illegal, e.g., two transports can not be connected to each other.

TABLE 1

The rules used for the consequence propagation between a transport (T) and a source (S).

| | |
|---|---|
| Ia | ¬ (high flow)(T) ⇒ (normal capacity)(S) |
| Ib | (high flow)(T) ⇒ (low capacity)(S) |
| IIa | (normal capacity)(S) ⇒ (working)(S) |
| IIb | (low capacity)(S) ⇒ (failed)(S) |
| IIIa | (normal capacity)(S) ⇒ (ok)(S) |
| IIIb | ¬ (high flow)(T) ∧ (low capacity)(S) ⇒ (primary alarm)(S) |
| IIIc | (high flow)(T) ∧ (low capacity)(S) ⇒ (secondary alarm)(S) |

The MFM alarm analyzer 23a uses the causal connections that are modeled in an MFM model, i.e. the causal connections between functions modeling the plant. Consider for example a situation where the source S in FIG. 5 has a low capacity alarm state and the transport T has a low flow alarm state. In this case the source S is the primary and the transport is the secondary alarm, because IIIb implies that the source S is a primary alarm. On the other hand, if the situation were such that the transport T had a high flow alarm state and the source S had a low capacity alarm state, then the transport T would be the primary alarm and the source S would be the secondary alarm (IIIc).

When a sensor reports a change in alarm signal/alarm state, the alarm analyzer 23a defines a tree or a tree-like structure comprising all possible paths through the flow/network, such that every function appears only once in each path. Further the alarm analyzer 23a searches the tree starting from the function that has the most recently changed alarm signal/alarm state, to the end of the search path. The end of the search path is either a function with a sensor, or a function with only input or only output, that is, a source, a sink, an observer, or an actor function.

Figure 6:
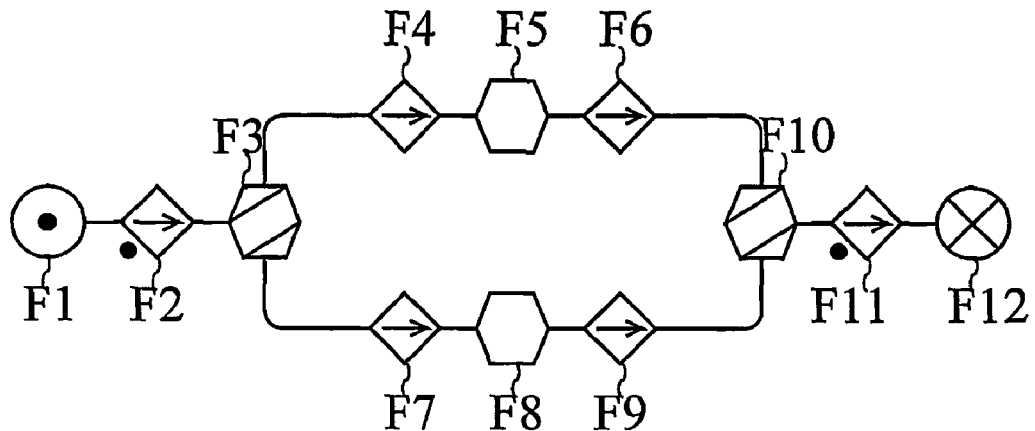
FIG. 6 shows an MFM model with forking balances.
Figure 7:
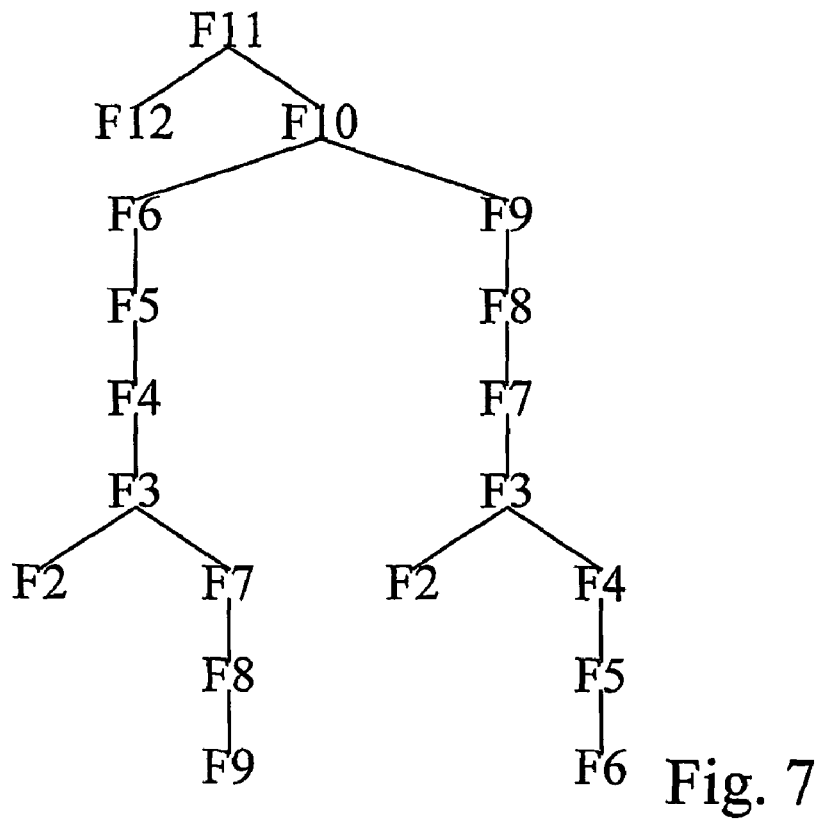
FIG. 7 shows a tree graph of the model in FIG. 6.

In the MFM model in FIG. 6 the dots indicate the functions having a sensor. If, for example, the transport F11 is the most recently changed alarm state, the alarm analyzer 23a searches the tree shown in FIG. 7. The tree is preferably traversed according to a traversing method, preferably implemented as the Waltz algorithm. In an embodiment of the invention, the method comprises, for generating new status information, the steps of:

8a.1 searching for a cause to the recently changed alarm signal/alarm state among the other functions in the tree, which functions are associated with alarm signals;

8a.2 indicating the alarm as secondary if the alarm state for a function is caused by another function in the network, otherwise indicating the alarm state as primary;

8a.3 propagating causal effects to other functions in the network if the alarm state is marked as primary;

8a.4 propagating alarm state to connected functions of conditional relations if the goal connected to the network has conditional relations;

8a.5 repeating from step 8a.1 for each function where the alarm signal/alarm state changes due to the propagation along conditional relations;

However, other implementations of the alarm analysis can also be used. According to another implementation of the alarm analysis all possible explanations to an alarm situation is found. This is particularly important in processes where very little information is available, for example when only a small number of the functions are measured. In these occasions there can be several possible explanations to the alarm situation. An embodiment of the alarm analysis comprises, for generating new status information, the steps of:

8a.1' determining all alarm signals/alarm states for the functions in a network;
8a.2' finding all possible root causes, wherein a possible root cause is an alarm signal/alarm state that can cause at least one observed alarm signal/alarm state according to the set of consequence propagation rules;
8a.3' collecting a combination of possible root causes such that it explains all the observed alarm signal/alarm state for the functions in the network;
8a.4' marking all alarm signals/alarm states not caused by any other alarm signal in the flow/network as primary, and all other alarm signals in the flow as secondary;
8a.5' repeating step 8a.4' for each combination of possible root causes in step 8a.3';
8a.6' propagating causal effects to other functions in the network if the alarm signal/alarm state is marked as primary;
8a.7' propagating alarm signals/alarm states to the connected functions of the conditional relations if the goal connected to the network has conditional relations;
8a.8' repeating from step 8a.1' for each function where the alarm signal/alarm state changes due to the propagation along conditional relations;

The both methods for alarm analysis described above can also be used for alarm analysis based on fuzzy logic. However, the alarm analysis based on fuzzy logic uses the measurement signals instead of the alarm signals/alarm states used above.

Using these methods, two types of conflicts can occur. Firstly, the guessed alarm state of a function can be high based on or according to one path, while based on another path it is low. This problem is solved by introducing a new guessed alarm state high low, which indicates that the alarm state of the function is either high or low. Secondly, the function at the root can be considered to be a primary alarm based on one path, while based on another path it is considered to be a secondary alarm. This problem is solved by assuming that the alarm state of the function is a secondary alarm, since it probably is caused by another alarm. However, even if it actually is a primary alarm the definition of a secondary alarm states that it might be a hidden primary alarm.

The alarm analyzer 23a can be implemented as a computer program or as a part of a computer program performing the steps 8a.1–8a.5 or 8a.1'–8a.8' as described above.

Sensor Fault Detector 23b

In one embodiment of the invention, the sensor fault detector 23b is intended to automatically detect false sensor measurements by comparing information from many sensors and applying the existing knowledge of the plant, e.g. the model of the plant, the set of consequence propagation rules, and thus detecting when the measurements are not in consistence with each other. If a suspect measurement is found, the sensor fault detector 23b is able to provide an alternative value for the measurement that would fit into the situation. The sensor fault detector 23b utilizes an MFM model of the plant and the consequence propagation rules (see for example table 1) from the alarm analyzer 23a in order to find suspect alarm signals. In one embodiment of the invention, the sensor fault detector 23b comprises three sensor validation means: means for condition checking 23b1, means for checking for normal/failed situations 23b2, and means for full irregularity analysis 23b3, which will be described below.

In one embodiment of the invention the means for condition checking 23b1 is arranged to compare measurements from two different flows/networks with knowledge about how one flow/network affects another flow or other flows comprised in the model of the plant. If the measurements are inconsistent with the knowledge, an erroneous sensor measurement has been discovered. When building an MFM model for use with the alarm analyzer 23a, each condition relation in the model has an associated property, which indicates in which way the failure of the connected goal will affect the connected function. This property can tell if the failure of a goal will mean that the function goes to a "fail high"-state, such as high flow or high volume or if it will go to a "fail low"-state, such as low flow or low volume.

FIG. 8 shows an example of an MFM model of a plant comprising two networks N1 and N2. The lower network N2 describes a flow of electrical energy from a power supply, described by the function F4, via a cord, described by the function F5, to a pump, described by the function F6. Together these functions, F4, F5, F6, achieve the goal G2, which can be explained as "Supply electrical power to the pump". The upper network N1 describes a flow of water from a source, described by a source function F1, via the pump, described by a transport function F2, to a sink, described by a function F3. Together, these functions, F1, F2, F3, achieve the goal G1. In order for the pump to transport water, as described by function F2, it needs electrical power. Therefore there is a condition or a condition relation C1 between the goal G2 of the network N2 and the function F2 of the network N1, indicating this requirement. If the goal G2 is not fulfilled, i.e., the power supply is not fulfilled, the pump will not be able to pump water and consequently the function F2 will be in a low flow state. Thus, the water flow will stop if the pump does not receive any electrical energy, so the properties of the condition C1 tells that if the goal G2 is not achieved, the function F2 will go to a low flow state.

FIG. 9 shows the same model as FIG. 8. In FIG. 9a, there is a low flow alarm on the function F5, indicated by a vertically and downwardly directed arrow. This low flow alarm indicates a low flow of electricity to the pump. Furthermore, there is a low flow alarm on the function F2 also indicated by a vertically and downwardly directed arrow. This indicates a low flow of water through the pump. In this case, the alarm state of the function F2 matches the information from the condition C1, i.e., the function F2 should go to a low flow state if the goal G2 is not achieved.

In FIG. 9b there is a low flow alarm on the function F5, just as before, but a high flow alarm on the function F2. In this case, the alarm state of the function F2 does not match the expected value computed from the fact that the goal G2 is failed, and the properties of the condition C1 as mentioned before. In this case, the topmost network N1 is pointed out as having a possibly suspect alarm situation.

There is another situation, which the means for condition checking 23b1 will identify. If the function F2 in FIG. 9a does not have an alarm, i.e., the function F2 is in a normal state, this will also be recognized and indicated.

An embodiment of the method of condition checking comprises, for generating new status information, the steps of:

8b.1 determining if an alarm signal of a function, connected via a condition to non-achieved goal in the MFM model, is not in the expected failure state; and 8b.2 indicating the alarm signal as inconsistent.

In one embodiment of the invention the means for checking for normal/failed situations 23b2 is arranged to compare sensor measurements within a flow/network and compare them with knowledge about how the flow is connected, i.e. how the functions comprised in the flow are connected to each other. If the compared measurements are inconsistent an erroneous measurement has been detected. The previous method for checking for normal/failed situations, i.e. the means for condition checking, is designed to cover inconsistencies between networks, via the condition relations. There is however, another kind of simple inconsistency that can occur within an MFM network, and which might indicate suspicious alarm signals.

Figures 10A, 10B:
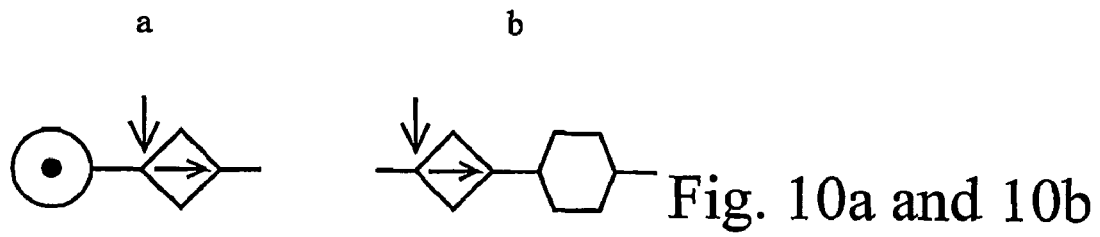
FIG. 10a shows an alarm situation with no suspicious alarms.
FIG. 10b shows an alarm situation with no explanation according to the consequence rules in the MFM model.

In FIG. 10a, the alarm situation can be explained with the consequence propagation rules in the MFM model, since a low flow alarm in a transport function will not cause any low capacity alarm in a connected source function. Thus no conflicts exist. On the other hand, in FIG. 10b the situation cannot be explained by the consequence propagation rules. Two consequence propagation rules that can come in question here. Firstly, "a low flow in a transport to the left of a storage will cause a low volume in the storage" and secondly, "a normal situation in a storage to the right of a transport will cause a normal situation in the transport". The situation in the FIG. 10b does not match either of these consequence propagation rules, and therefore the network containing the functions is indicated as having a suspicious alarm situation.

Figure shows parts of two networks comprising two storage functions connected or coupled to each other via a transport function. Further, the topmost network shows that a reasonable guess by an operator might be that there is an absence of an alarm and in the lower network that the single alarm is a false alarm. Both of these statements would of course require that this situation remain for some time to rule out the possibility that it is only transitional effects.

An embodiment of the method for checking for normal/failed situations comprises, for generating new status information, the steps of:

8b.1' checking the alarm signals for each pair of connected functions; and 8b.2' indicating the functions as inconsistent, if their alarm signals do not agree with the consequence propagation rules.

Figure 11:
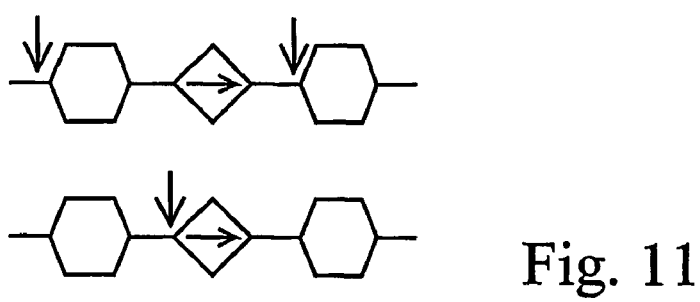
FIG. 11 shows two alarm situations, which will be indicated as suspicious.

In one embodiment of the invention the means for full consequence irregularity analysis 23b3 is arranged to use sensor measurements from a single flow/network and to use knowledge on how the flow is connected, i.e. how the functions comprised in the flow are connected to each other. If the assumption of a sensor measurement fault can decrease the number of observed faults in the flow and thus simplifying the fault situation, the method will present the sensor measurement as possibly wrong. Thus the method for full consequence irregularity analysis is designed to find any kind of situation where the alarm situation would make more sense according to the consequence propagation rules and under the assumption that one alarm signal is incorrect. If such a situation is found, this is taken as an indication that this specific alarm signal can be faulty. This kind of situation, whereby assuming a single faulty alarm signal a simpler alarm situation is obtained, is characterized by the fact that the number of primary alarms decreases. This fact is used to determine which MFM networks will be inspected by the means for full consequence irregularity analysis 23b3. In a trivial case with an MFM network having a single failed function, such as the lower network in FIG. 11, the alarm situation can always be simplified by changing the single failed function to a normal state, so this situation will not be described further.

Instead, consider the case having two primary alarms within an MFM network. In this case, it might be possible to find a solution with only one primary alarm by assuming that one of the given alarms is erroneous. The solution with only one primary alarm is then considered to simplify the given alarm situation and is therefore more probable as a consequence of the assumption that single faults occurs more frequently than multiple faults in the process. Therefore, the MFM network in question is reported as having a suspicious alarm situation, and the simpler solution or solutions are presented together with the function that was assumed to have an incorrect alarm state to an operator of the plant.

Figure 12:
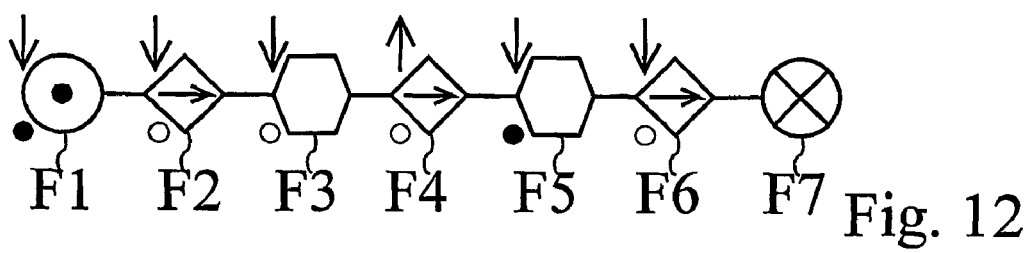
FIG. 12 Shows an embodiment of an MFM flow with two primary alarms, which can be simplified by assuming that one of the alarms is incorrect.

In FIG. 12, it is assumed that every MFM function has an associated measurement or alarm signal. Thus in FIG. 12 an MFM flow is shown, wherein six of the seven functions have active alarms, and wherein the function F7 is in a normal state. The dark dots indicate the functions having primary alarms according to the alarm analysis 23a, and the lighter dots indicate functions having secondary alarms. In order to see whether this situation can be simplified or not, each measured function will be checked to see if the number of primary alarms will decrease if the inspected function is assumed to have an incorrect alarm state.

Thus, consider first the source function F1. A source function S has only two alarm states, normal and low capacity. If the measurement for F1 in FIG. 12 is incorrect, it must be normal. If F1 is assumed to be in a normal state, there will be no decrease in the number of primary alarms, since the functions F2 and F5 will become primary. So there is nothing gained from assuming that F1 is incorrect and the alarm for F1 is thus not reported as suspect.

Figure 13:
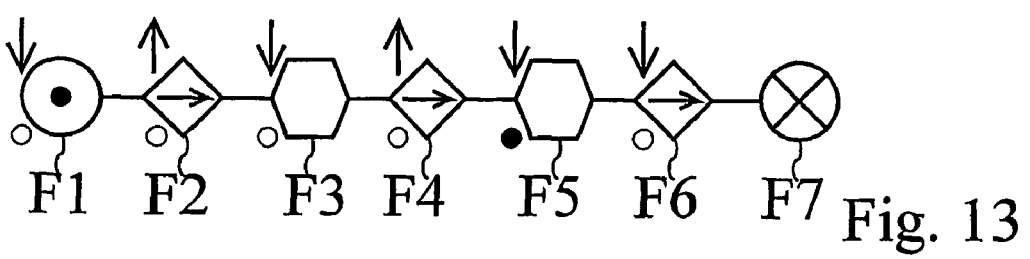
FIG. 13 shows the network in FIG. 12, wherein the function F2 is assumed to be in a high flow state instead of a low flow state.

If the transport function F2 is assumed to be in a normal state instead of a low flow state nothing is gained either, since the functions F1 and F5 still will be primary alarms. But if the transport function F2 is assumed to be in a high flow state, the situation will look like the one shown in FIG. 13, wherein there is only one primary alarm namely the function F5. All the other alarms have become secondary alarms and thus the situation has been simplified. Therefore, the alarm on the function F2 is presented to the operator-as possibly suspect together with the simplified situation. Thus the operator has to decide whether to make further investigations into this particular sensor measurement or not.

Figure 14:
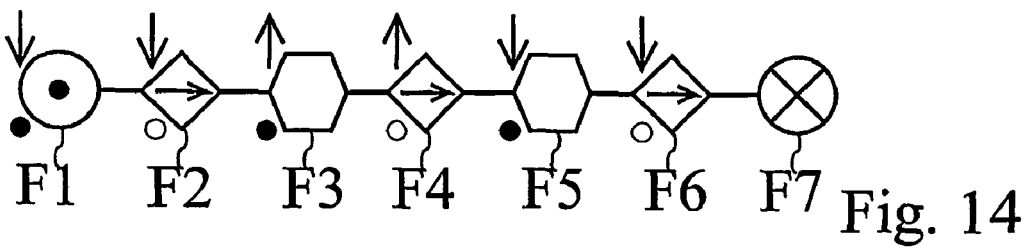
FIG. 14 shows the network in FIG. 12, wherein the function F3 is assumed to be in a high volume state instead of a low volume state.

By assuming that the function F3 in FIG. 12 should be in a normal state does not simplify the situation, since the functions F1 and F5 still will be considered as primary alarms. By assuming that the function F3 should be in a high volume state will not simplify the situation either. Instead the situation will become worse, as shown in FIG. 14. Here the functions F1, F3 and F5 are considered as primary alarms, thereby increasing the number of primary alarms from two to three.

Figure 15:
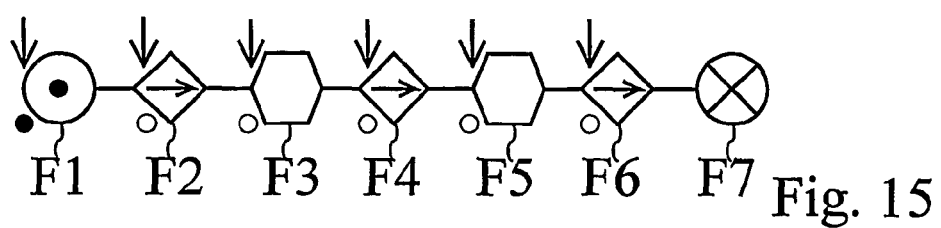
FIG. 15 shows the network in FIG. 12, wherein the function F4 is assumed to be in a low flow state instead of a high flow state.

By assuming that the function F4 in FIG. 12 should be in a normal state instead of high flow state, the situation does not improve. But, if the function F4 assumed to be in a low flow state instead, the situation in FIG. 15 is obtained, wherein there is only one primary alarm, and the situation has thus been simplified.

By doing the same analysis for the functions F5, F6, and F7, no further situation with only one primary alarm is found. The final result of the analysis of this particular situation is therefore that it can be simplified from two primary alarms to one in two different ways. Firstly, by assuming that the measurement for the function F2 is wrong, and should have been in a high flow state instead of a low flow state. Secondly, by assuming that the measurement for the function F4 is wrong, and should have been in a low flow state instead of a high flow state.

Figure 16:
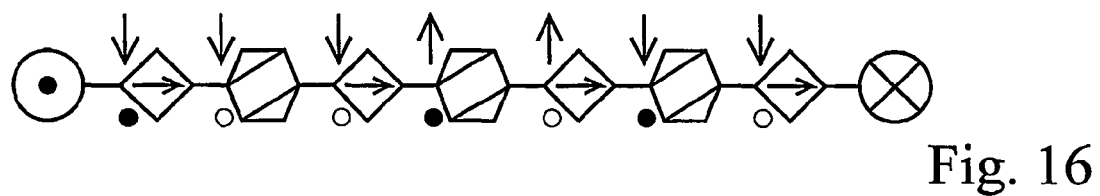
FIG. 16 shows an alarm situation, which cannot be reduced to comprise fewer primary alarms by assuming that a single measurement is incorrect.

In FIG. 16, there is an MFM flow/network with an alarm situation wherein three of the functions are considered as primary alarms. In this example the number of primary alarms cannot be reduced by assuming that one single measurement is incorrect. Thus at least two measurements must be changed in order to reduce the number of primary alarms.

An embodiment of the method of full consequence irregularity analysis comprises, for generating new status information, the steps of:

8b.1" finding a network with at least two primary alarms;
8b.2" changing the alarm state of the function to another state for each function in the network;
8b.3" storing the achieved situation and indicating the investigated alarm signal as inconsistent, if the number of primary alarms in the network decreases; and
8b.4" repeating from step 8b.1" for each additional network with at least two primary alarms.

The sensor fault detector 23b can be implemented as a computer program or as a part of a computer program performing the steps 8b.1–8b.2, 8b.1'–8b.2' or 8b.1"–8b.4" as described above.

Fault Diagnozer 23c

The fault diagnozer 23c is a fault diagnostic unit 23c arranged to find the root causes for unfulfilled goals by traversing the MFM model or graph. When the fault diagnozer 23c, during the traversal of the MFM model, finds a single flow function, such as a transport function or a source function, it uses questions or measurements to find the failure state of those flow functions. The fault diagnozer 23c can for example put a question to the operator whether a pump is working or not. Depending on the answers of the operator to the diagnostic questions or depending on the measurements of for example the pump, parts of the MFM model may not have to be traversed. If for example the goal G1, in FIG. 8, is not fulfilled, but the pump F2 is working, i.e., is in a normal state, the part of the MFM model comprising the functions F4, F5 and F6 have not to be traversed to find the fault. Thus the fault diagnozer 23c can reduce the MFM graph to be transversed and speed up the fault diagnosis. The fault diagnozer 23c can further be combined with the alarm analyzer 23a which is performed incrementally as information comes in to the apparatus database 22 and thus interleaving with the fault diagnozer 23c.

An embodiment of the method of failure diagnosis comprises, for generating new status information, the steps of:

8c.1 choosing a goal for diagnosis. In one embodiment of the invention the operator chooses the goal by means of for example an input command to the diagnostic apparatus 20. If the goal is a top-level goal, the whole model will be investigated. However, the goal chosen can also be a sub-goal, in which case only part of the process, i.e., a part of the MFM model, will be diagnosed;
8c.2 propagating the search downwards from the goal, via achieve relations, into the connected network of flow functions, each of which is now investigated;
8c.3 asking a diagnostic question associated to a flow function in order to find out whether the corresponding component 15 is currently realizing the function, i.e., whether the function is available or not, or finding information about the working order of the function by means of a sensor connected to the component 15;
8c.4 setting the appropriate alarm state of the flow function, and possibly activating the alarm analyzer 23a; and
8c.5 recursively investigating a connected sub-goal if a flow function connected to the sub-goal by means of a condition relation is found to be faulty or has no means of being checked, or skipping the part of the sub-tree that comprises the function if the function is working.

The fault diagnozer 23c can be implemented as a computer program or as a part of a computer program performing the steps 8c.1–8c.5 as described above, and comprising an incremental and local algorithm. This implementation of the fault diagnozer 23c implies that the entire MFM graph has not to be traversed every time the fault diagnosis is performed, but only the part of the graph comprising the fault, since the parts of the graph having fulfilled sub-goals are skipped. It should be noted that the search propagates along static connections, since the MFM model of the plant is static and built only once. Thus there is no need for global search, pattern matching or conflict resolution, and thus the fault diagnozer 23c is very efficient. The fault diagnozer 23c can be implemented as a computer program or as a part of a computer program performing the steps 8c.1–8c.5 as described above.

What-If Scenario Analyzer 23d

In one embodiment of the invention, the what-if scenario analyzer 23d, also called the failure mode analyzer (FMA) 23d, developed for MFM is based on the consequence propagation rules and expanded with timing information or time dependent information associated with condition relations and MFM storage functions. In the failure mode analyzer 23d, the consequence propagation will not stop until the whole model has been searched, because the functions that seem to be working now can stop working in the future. Preferably, the timing information is only associated to MFM storage functions and to condition relations. This since failures will take time to propagate between MFM networks, since MFM storage functions often have an intrinsic capability to delay the propagation of failures within a network, and since adding time delay information to all functions and relations can be unfeasible in terms of modeling effort. However, it should be understood that it is possible to provide all functions and relations with this timing information.

The timing information needed for an analysis can be derived either from simulated cases, stored real process data, or estimated by hand.

Figure 17:
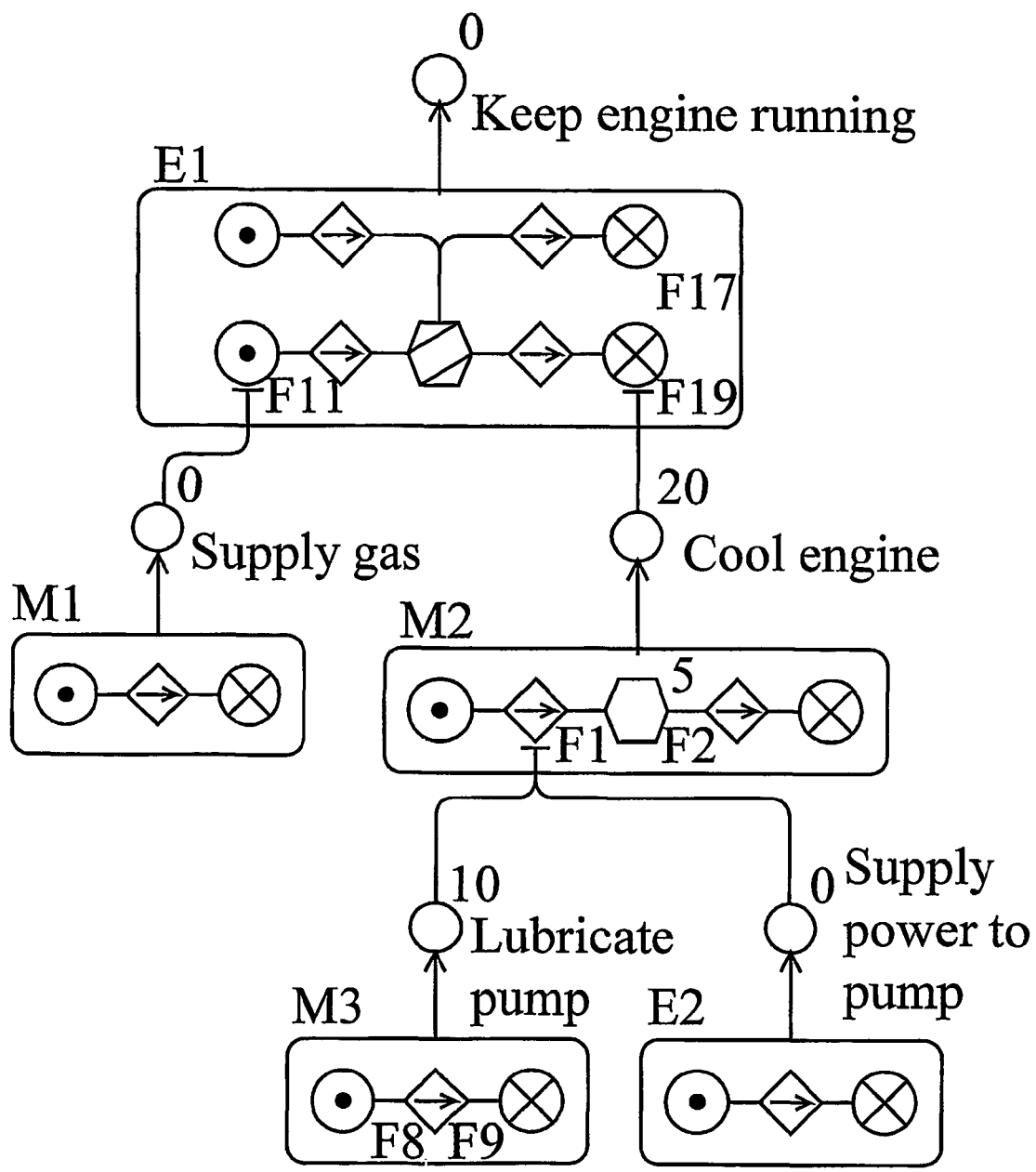
FIG. 17 shows an embodiment of an MFM model of an engine.

When building the MFM model it is possible to assign timing information to each MFM storage function and to each condition relation. FIG. 17 shows an MFM model of an engine with timing information visible. In this model it is assumed that the engine will stop directly if the gasoline support fails, that the engine will run for 20 minutes if the engine cooling fails, that the pump will fail after 10 minutes if the lubrication of the pump stops, that the pump will fail immediately if the power to the pump fails, and that the stored water in the engines heat exchanger will last for 5 minutes if the pump fails.

After the timing information is entered into the model, it is possible to run test cases. In an embodiment of the invention, this comprises the steps of:

setting the start state (the state of the system at time zero), by asserting failures in one or more functions;

starting the analysis by a user command; and presenting the result to an operator.

Figure 18:
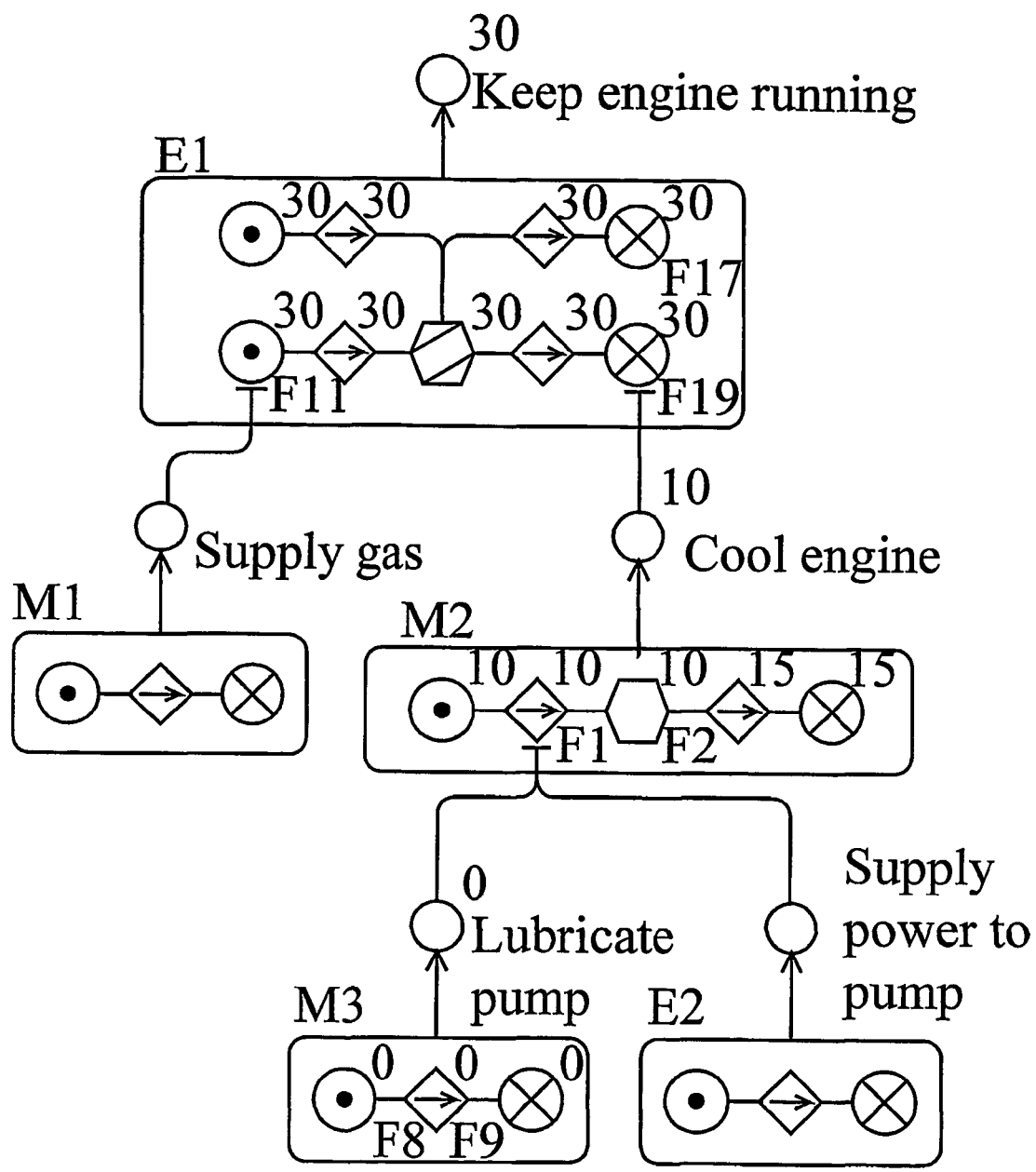
FIG. 18 shows the model according to FIG. 17, wherein the lubricant oil has run out.

In FIG. 18 the lubricant oil has run out and the result of this is that the pump will fail due to lack of lubricant, and after a while the engine will fail due to lack of cooling. After the complete failure mode analysis, the failure mode analyzer 23d will collect these failures and generate a list of all functions with alarmed sensors, sorted in order of time-to-failure. This is exemplified in FIG. 19.

The failure mode analyzer 23d works by assigning new state information to each function in the MFM model. The new information consists of a time stamp, called failure time, which holds information on when the function will fail. There is also a variable called current failure time, which is used during the traversal of the model. It is used to keep track of the current "time" in the system.

For each function with an alarmed sensor, i.e. a sensor indicating an alarm, the method of failure mode analysis according to an embodiment of the invention comprises, for generating new status information, the steps of:

8d.1 setting the failure time of the function to 0;

8d.2 propagating the alarms as far as possible according to the consequence propagation rules and setting the failure time of the currently examined function to the current failure time, if the function has not been reached before or if the failure time stored for the function is larger than the current failure time;

8d.3 updating the current failure time when passing conditions and MFM storage functions; and 8d.4 stopping the propagation if the failure time of the currently examined function is less than the current failure time.

The failure mode analyzer 23d can be implemented as a computer program or as a part of a computer program performing the steps 8d.1–8d.4 as described above.

The Process Measurement Analyzer 23e

The process measurement analyzer 23e is a service function 23 arranged to analyze the status signals of a specific process and produce a report of the quality of the alarms, alarm signals, and measurements of the process. It monitors among other thing responses to an alarm situation, frequency of specific alarms, and the behavior of the process measurements. For example, if an alarm signal is generated often but is always ignored by the operators of the plant this can be an indication of that the limits for that alarm are either badly tuned or that that alarm is unnecessary. Another example can be a measurement, which usually is constant and has a sharp peak, and a few moments after the occurrence of that peak there is a burst of alarms. In this example the process measurement analyzer 23e can come to the conclusion that the alarm limits for that particular alarm are set to wide. All the information collected by the process measurement analyzer 23e is compiled into a report and stored in the apparatus database 22. Thus the information can be used by the maintenance personal at the plant to reduce the number of false alarms and alarm signals.

In one embodiment of the invention, the method of process measurement analysis comprise, for generating new status information, the steps of:

8e.1 storing statistical information about the status signal. This could be, e.g., the period of time since the last occurrence of an alarm or an event, or the number of times an alarm or an event signal has been triggered; and 8e.2 calculating properties of the status signal, e.g., mean or variance of a measurement signal, or number of times an alarm or event signal is triggered per time unit.

The process measurement analyzer 23e can be implemented as a computer program or as a part of a computer program performing the steps 8e.1–8e.2 as described above.

The system and the apparatus for diagnosing a flow process according to the inventive method comprise means for performing the steps and the functions of the method. All means can be realized as hardware units and most of them are advantageously implemented as computer programs, executing on hardware parts of the arrangement. In particular, a computer program product, for use with a diagnosing system, for carrying out an embodiment of the inventive diagnosing method and realizing an embodiment of the inventive diagnosing structure comprises a recording medium and means for performing said method and realizing said diagnosing structure recorded on the storage medium.

EXAMPLE

To illustrate an example of how the service functions 23 work together as a system, the engine system in FIG. 17 will be used. The diagnostic apparatus 20 is connected to the target system 10, which in this case is the engine.

The system detects that the goal "cool engine" is not fulfilled, i.e., the temperature of the engine is too high, and the diagnostic system manager 24 orders the fault diagnozer 23c to execute its operation. The fault diagnozer 23c finds from the sensor readings that the "lubricant source" (F8) has a low capacity alarm, the "lubricant transport" (F9) has a low flow alarm, the "water pump" (F1) has a low temperature alarm, and the "engine heat exchanger" (F2) has a high temperature alarm, thus the result of the fault diagnosis is that the "cool engine"-goal has failed due to failure of the lubricant supply system.

The diagnostic system manager 24 next orders the sensor fault detector 23b to execute its operation. The sensor fault detector 23b operates in conjunction with the alarm analyzer 23a. The result from the sensor fault detector 23b is that the low temperature alarm from the "water pump" (F1) is inconsistent with the other alarms and thus is reported as suspect. The expected alarm from the "water pump" (F1) should be a high temperature alarm. The alarm analyzer 23a uses the result from the sensor fault detector 23b and finds that the primary alarm is the low capacity alarm from the "lubricant source" (F8), and the other alarms are just consequences of this alarm.

After the alarm analyzer 23a has completed its operation, the diagnostic system manager 24 orders the what-if scenario analyzer 23d to execute its operation. The what-if scenario analyzer 23d analyzes the model and reports that the "heat energy sink" (F19) will fail in 20 minutes causing the engine to fail.

To summarize the scenario above the root cause of the failed "cool engine"-goal is the failure of the lubricant source, i.e., the lubricant system has run out of lubricant. This will in 20 minutes cause the failure of the "keep engine running"-goal. Furthermore, the temperature sensor connected to the "water pump" (F1) is either broken, or the alarm limits are badly tuned. This information will be stored in the report compiled by the process measurement analyzer 23e and stored in the apparatus database 22.

The invention claimed is:

1. A method for diagnosing a flow system of components, the flow system having at least a status signal indicative of the status of a component, comprising the steps of:
receiving said status signal in an instrumentation and control database;
comparing said status signal with limit values;
setting a status signal by generating:
an alarm signal;
an alarm, if the status signal is outside the range of the limit values; or
an event;
outputting said status signal from said instrumentation and control database;
receiving said status signal in a diagnostic apparatus;
storing said status signal in a data storage device;
detecting at least one change in said status signal;
controlling by means of a control unit said service function dependent on selectable or predetermined information; and
starting by means of said control unit at least one service function generating status information based on said status signal and dependent on a functional model of said flow system and on a set of predetermined rules describing the relationship between components of said flow systems;
wherein the step of generating status information comprises the steps of;
searching for a cause to a changed alarm among the other functions in a network of said functional model, associated with alarm signals;
indicating the alarm signal as secondary, if the alarm signal for a function is caused by another function in the network, otherwise indicating the alarm signal as primary;
propagating causal effects to other functions in the network, if the alarm signal is indicated as primary;
propagating alarm signals to connected functions of conditional relations, if the goal connected to the network has conditional relations; and
repeating the step of searching for a cause to a changed alarm for each function where the alarm signals changes due to the propagation rules.

2. The method according to claim 1, wherein the step of generating status information comprises the steps of:
determining all alarm signals for the functions in a network of said functional model;
finding all possible root causes;
collecting a combination of possible root causes such that it explains all the observed alarm signals for the functions in the network;
marking all alarm signals not caused by any other alarm signal in the network as primary, and all other alarm signals in the network as secondary;
repeating the step of marking all alarm signals not caused by any other alarm signal in the network as primary, and all other alarm signals in the network as secondary for each combination of possible root causes collected;
propagating causal effects to other functions in the network if the alarm signal is marked as primary;
propagating alarm signals to the connected functions of the conditional relations if the goal connected to the network has conditional relations; and
repeating the step of determining all alarm signals for the functions in the network of said functional model for each function where the alarm signal changes due to the propagation along conditional relations.

3. The method according to claim 1, wherein the step of generating status information comprises the steps of:
storing statistical information about said status signal; and
calculating properties of said status signal.

4. The method according to claim 1, further comprising the step of monitoring the operation of said service function.

5. The method according to claim 1, further comprising the steps of:
storing said generated status information in said data storage device;
detecting a change in said generated status information; and
outputting said generated status information.

6. The method according to claim 5, further comprising the steps of:
receiving said generated status information in said instrumentation and control database;
detecting said generated status information in said instrumentation and control database; and
presenting said generated status information on a display unit.

7. The method according to claim 1, wherein said set of predetermined rules comprises a set of consequence propagation rules.

8. The method according to claim 1, wherein said functional model is a multilevel flow model (MFM) representing said flow system.

9. The method according to claim 1, wherein said set of predetermined rules comprises a set of consequence propagation rules.

10. The method according to claim 1, wherein said functional model is a multilevel flow model (MFM) representing said flow system.

11. A method for diagnosing a flow system of components, the flow system having at least a status signal indicative of the status of a component, comprising the steps of:
receiving said status signal in an instrumentation and control database;
comparing said status signal with limit values;
setting a status signal by generating;
an alarm signal;
an alarm, if the status signal is outside the range of the limit values; or
an event
outputting said status signal from said instrumentation and control database;
receiving said status signal in a diagnostic apparatus;
storing said status signal in a data storage device;
detecting at least one change in said status signal;
controlling by means of a control unit said service function dependent on selectable or predetermined information; and
starting by means of said control unit at least one service function generating status information based on said status signal and dependent on a functional model of said flow system and on a set of predetermined rules describing the relationship between components of said flow system;
wherein the step of generating status information comprises the steps of:
finding a network of said functional model with at least two primary alarms;
changing the alarm state of a function to another state for each function in the network;
storing the achieved situation and indicating the investigated alarm signal as inconsistent if the number of primary alarms in the network decreases; and repeating the step of finding a network of said functional model with at least two primary alarms for each additional network with at least two primary alarms.

12. The method according to claim 11, wherein the step of generating status information comprises the steps of:
determining if an alarm signal of a function in a network of said functional model, connected via a condition to a non-achieved goal, is not in the expected failure state; and
indicating that alarm signal as inconsistent.

13. The method according to claim 11, wherein the step generating status information comprises the steps of:
checking the alarm signals for each pair of connected functions in a network of said functional model; and
indicating the functions as inconsistent, if their alarm signals do not agree with the consequence propagation rules.

14. A method for diagnosing a flow system of components, the flow system having at least a status signal indicative of the status of a component, comprising the steps of:
receiving said status signal in an instrumentation and control database;
comparing said status signal with limit values;
setting a status signal by generating:
an alarm signal;
an alarm, if the status signal is outside the range of the limit values; or
an event;
outputting said status signal from said instrumentation and control database;
receiving said status signal in a diagnostic apparatus;
storing said status signal in a data storage device;
detecting at least one change in said status signal;
controlling by means of a control unit said service function dependent on selectable or predetermined information; and
starting by means of said control unit at least one service function generating status information based on said status signal and dependent on a functional model of said flow system and on a set of predetermined rules describing the relationship between components of said flow system;
wherein the step of generating status information comprises the steps of;
choosing a goal comprised in said functional model for diagnosis;
propagating the search downwards from the selected goal, via achieved relations, into a connected network of flow functions;
asking a diagnostic question associated to a flow function in order to find out whether the corresponding component is currently realizing the flow function, or finding information about the working order of the flow function by means of a sensor connected to the component;
setting the appropriate alarm state of the flow function; and
recursively investigating a connected sub-goal if a flow function connected to the sub-goal by means of a condition relation is found to be faulty or has no means of being checked, or skipping the part of the sub-tree that comprises the flow function if the flow function is working.

15. A method for diagnosing a flow system of components, the flow system having at least a status signal indicative of the status of a component, comprising the steps of:
receiving said status signal in an instrumentation and control database;
comparing said status signal with limit values;
setting a status signal by generating:
an alarm signal;
an alarm, if the status signal is outside the range of the limit values; or
an event;
outputting said status signal from said instrumentation and control database;
receiving said status signal in a diagnostic apparatus;
storing said status signal in a data storage device;
detecting at least one change in said status signal;
controlling by means of a control unit said service function dependent on selectable or predetermined information; and
starting by means of said control unit at least one service function generating status information based on said status signal and dependent on a functional model of said flow system and on a set of predetermined rules describing the relationship between components of said flow system;
wherein the step of generating status information comprises the steps of:
setting the failure time of a flow function comprised in said functional model to 0;
propagating the alarms as far as possible according to the consequence propagation rules and setting the failure time of the currently examined flow function to the current failure time, if the flow function has not been reached before or if the failure time stored for the flow function is larger than the current failure time;
updating the current failure time when passing condition relations and storage functions; and
stopping the propagation if the failure time of the currently examined flow function is less than the current failure time.

16. A method for diagnosing a flow system of components, the flow system having at least a status signal indicative of the status of a component, comprising the steps of:
receiving said status signal in a diagnostic apparatus;
storing said status signal in a data storage device;
detecting at least one change in said status signal;
controlling by means of a control unit said service function dependent on selectable or predetermined information; and
starting by means of said control unit at least one service function generating status information based on said status signal and dependent on a functional model of said flow system and on a set of predetermined rules describing the relationship between components of said flow system;
wherein the step of generating status information comprises the steps of:
searching for a cause to a changed alarm among the other functions in a network of said functional model, associated with alarm signals;
indicating the alarm signal as secondary, if the alarm signal for a function is caused by another function in the network, otherwise indicating the alarm signal as primary;
propagating causal effects to other functions in the network, if the alarm signal is indicated as primary;
propagating alarm signals to connected functions of conditional relations, if the goal connected to the network has conditional relations; and
repeating the step of searching for a cause to a changed alarm for each function where the alarm signals changes due to the propagation rules.

17. The method according to claim 16 wherein the step of generating status information comprises the steps of:
   determining all alarm signals for the functions in a network of said functional model;
   finding all possible root causes;
   collecting a combination of possible root causes such that it explains all the observed alarm signals for the functions in the network;
   marking all alarm signals not caused by any other alarm signal in the network as primary, and all other alarm signals in the network as secondary;
   repeating the step of marking all alarm signals not caused by any other alarm signal in the networks as primary and all other alarm signals in the network as secondary for each combination of possible root causes collected;
   propagating causal effects to other functions in the network if the alarm signal is marked as primary;
   propagating alarm signals to the connected functions of the conditional relations if the goal connected to the network has conditional relations; and
   repeating the step of determining all alarm signals for the functions in the network of said functional model for each function where the alarm signal changes due to the propagation along conditional relations.

18. The method according to claim 16 further comprising, the step of monitoring the operation of said service function.

19. The method according to claim 16, wherein the step of generating status information comprises the steps of:
   storing statistical information about said status signal; and
   calculating properties of said status signal.

20. The method according to claim 16, further comprising the steps of:
   storing said generated status information in said data storage device;
   detecting a change in said generated status information; and
   outputting said generated status information.

21. The method according to claim 16, further comprising the step of presenting said generated status information on a display unit.

22. A method for diagnosing a flow system of components, the flow system having at least a status signal indicative of the status of a component, comprising the steps of:
   receiving said status signal in a diagnostic apparatus;
   storing said status signal in a data storage device;
   detecting at least one change in said status signal;
   controlling by means of a control unit said service function dependent on selectable or predetermined information; and
   starting by means of said control unit at least one service function generating status information based on said status signal and dependent on a functional model of said flow system and on a set of predetermined rules describing the relationship between components of said flow system;
   wherein the step of generating status information comprises the steps of:
   finding a network of said functional model with at least two primary alarms;
   changing the alarm state of a function to another state for each function in the network;
   storing the achieved situation and indicating the investigated alarm signal as inconsistent if the number of primary alarms in the network decrease; and
   repeating the step of finding a network of said functional model with at least two primary alarms for each additional network with at least two primary alarms.

23. A method for diagnosing a flow system of components, the flow system having at least a status signal indicative of the status of a component, comprising the steps of:
   receiving said status signal in a diagnostic apparatus;
   storing said status signal in a data storage device;
   detecting at least one change in said status signal;
   controlling by means of a control unit said service function dependent on selectable or predetermined information; and
   starting by means of said control unit at least one service function generating status information based on said status signal and dependent on a functional model of said flow system and on a set of predetermined rules describing the relationship between components of said flow system;
   wherein the step of generating status information comprises the steps of:
   choosing a goal comprised in said functional model for diagnosis;
   propagating the search downwards from the selected goal, via achieved relations, into a connected network of flow functions;
   asking a diagnostic question associated to a flow function in order to find out whether the corresponding component is currently realizing the flow function, or finding information about the working order of the flow function by means of a sensor connected to the component;
   setting the appropriate alarm state of the flow function; and
   recursively investigating a connected sub-goal if a flow function connected to the sub-goal by means of a condition relation is found to be faulty or has no means of being checked, or skipping the part of the sub-tree that comprises the flow function if the flow function is working.

24. The method according to claim 23, wherein the step of generating status information comprises the steps of:
   determining if an alarm signal of a function in a network of said functional model, connected via a condition to a non-achieved goal, is not in the expected failure state; and
   indicating that alarm signal as inconsistent.

25. The method according to claim 23, wherein the step generating status information comprises the steps of:
   checking the alarm signals for each pair of connected functions in a network of said functional model; and
   indicating the functions as inconsistent, if their alarm signals do not agree with the consequence propagation rules.

26. A method for diagnosing a flow system of components, the flow system having at least a status signal indicative of the status of a component, comprising the steps of:
   receiving said status signal in a diagnostic apparatus;
   storing said status signal in a data storage device;
   detecting at least one change in said status signal;
   controlling by means of a control unit said service function dependent on selectable or predetermined information; and
   starting by means of said control unit at least one service function generating status information based on said status signal and dependent on a functional model of said flow system and on a set of predetermined rules describing the relationship between components of said flow system;
   wherein the step of generating status information comprises the steps of: setting the failure time of a flow function comprised in said functional model to 0;

propagating the alarms as far as possible according to the consequence propagation rules and setting the failure time of the currently examined flow function to the current failure time, if the flow function has not been reached before or if the failure time stored for the flow function is larger than the current failure time;

updating the current failure time when passing condition relations and storage functions; and stopping the propagation if the failure time of the currently examined flow function is less than the current failure time.

27. A computer program product for use in apparatus for diagnosing a flow system, comprising software code portions for directing a data processing system to perform all the method steps of claim 1.

28. A computer program product for use in apparatus for diagnosing a flow system, comprising software code portions for directing a data processing system to perform all the method steps of claim 16.

* * * * *